(12) United States Patent
Shuda et al.

(10) Patent No.: US 9,407,811 B2
(45) Date of Patent: Aug. 2, 2016

(54) FOCUS CONTROL UNIT IN IMAGING APPARATUS, METHOD OF CONTROLLING THE FOCUS CONTROL UNIT AND MEDIUM FOR CONTROLLING THE FOCUS CONTROL UNIT

(71) Applicant: SONY CORPORATION, Tokyo (JP)

(72) Inventors: Tomonori Shuda, Tokyo (JP); Takashi Kawai, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/357,967

(22) PCT Filed: Dec. 17, 2012

(86) PCT No.: PCT/JP2012/082627
§ 371 (c)(1),
(2) Date: May 13, 2014

(87) PCT Pub. No.: WO2013/094552
PCT Pub. Date: Jun. 27, 2013

(65) Prior Publication Data
US 2014/0327812 A1    Nov. 6, 2014

(30) Foreign Application Priority Data
Dec. 22, 2011  (JP) ................................ 2011-280957

(51) Int. Cl.
*H04N 5/232*     (2006.01)
*G02B 7/38*      (2006.01)

(52) U.S. Cl.
CPC .............. *H04N 5/23212* (2013.01); *G02B 7/38* (2013.01)

(58) Field of Classification Search
None
See application file for complete search history.

(56) References Cited

U.S. PATENT DOCUMENTS

| 2002/0067421 | A1* | 6/2002 | Tanaka et al. | .................. 348/345 |
| 2004/0125229 | A1* | 7/2004 | Aoyama et al. | ................ 348/345 |
| 2007/0212049 | A1* | 9/2007 | Guroglu et al. | ................ 396/127 |
| 2010/0020222 | A1* | 1/2010 | Jones et al. | ............. 348/333.02 |
| 2012/0057048 | A1* | 3/2012 | Kindaichi | ................ 348/231.99 |

FOREIGN PATENT DOCUMENTS

| JP | 2007/139893 A | 6/2007 |
| JP | 2009-152725 A | 7/2009 |
| JP | 2010-50574 A  | 3/2010 |
| JP | 2010-139666 A | 6/2010 |
| JP | 2010-176128 A | 8/2010 |
| JP | 2011-128623 A | 6/2011 |

OTHER PUBLICATIONS

International Search Report issued Feb. 19, 2013 in PCT/JP2012/082627.

* cited by examiner

*Primary Examiner* — Albert Cutler
(74) *Attorney, Agent, or Firm* — Chip Law Group

(57) ABSTRACT

Fast Focus control is to be performed. The imaging apparatus is an imaging apparatus that includes a focus control unit. The focus control unit performs focus control based on the contrast in an image and the processing result of a two-image matching process. The image is an image generated by an imaging unit. The two-image matching process is a process to be performed with the use of two images that are generated by the imaging unit, with the focus lens being located in different positions.

12 Claims, 11 Drawing Sheets

EXAMPLE OF FITTING CURVE

POSITION OF FOCUS LENS

FOCUS CONTROL UNIT IN IMAGING APPARATUS, METHOD OF CONTROLLING THE FOCUS CONTROL UNIT AND MEDIUM FOR CONTROLLING THE FOCUS CONTROL UNIT

TECHNICAL FIELD

The present technique relates to imaging apparatuses. More particularly, the present technique relates to an imaging apparatus that performs focus control, a method of controlling the imaging apparatus, and a program for causing a computer to implement the method.

BACKGROUND ART

In recent years, imaging apparatuses, such as a digital video camera (a recorder with a camera, for example) that generates images (image data) by imaging objects such as sceneries and persons, and records the generated images as image content, have become widely popular. Also, a large number of imaging apparatuses that automatically perform focus control have been suggested so as to prevent failures in imaging processes according to user operations.

For example, there is a suggested imaging apparatus that performs focus control by using the intensities of the contrasts in image data. Also, there is a suggested imaging apparatus that estimates a position to which the focus lens is to be moved, using two images that are captured at different focal distances (see Patent Document 1, for example)

CITATION LIST

Patent Document

Patent Document 1: JP 2011-128623 A

SUMMARY OF THE INVENTION

Problems to be Solved by the Invention

By the above described conventional technique, focus control can be performed with the use of image data, and there is no need to provide an additional device for performing focus control in an imaging apparatus.

However, depending on objects and imaging conditions, the focus lens might be moved to a position that is not the focusing position, or it might take time to move the focus lens to the focusing position. Therefore, it is critical to perform fast focus control, regardless of objects and imaging conditions.

The present technique has been developed in view of those circumstances, and aims to perform fast focus control.

Solutions to Problems

The present technique has been developed to solve the above problems, and a first aspect thereof is an imaging apparatus including a focus control unit that performs focus control based on the contrast in an image generated by an imaging unit and the processing result of a 2-image matching process using two images that are generated by the imaging unit with a focus lens being located in different positions. The first aspect of the present technique is also a method of controlling the imaging apparatus, and a program for causing a computer to implement the method. Accordingly, focus control is effectively performed based on the contrast in the image and the processing result of the 2-image matching process.

In the first aspect, the focus control unit may determine the amount of additional movement of the focus lens based on the processing result of the 2-image matching process when the focus lens is moved based on the contrast. Accordingly, when the focus lens is moved based on the contrast, the amount of additional movement of the focus lens is effectively determined based on the processing result of the 2-image matching process.

In the first aspect, the focus control unit may determine the amount of additional movement only when the difference between the position of the focus lens and a focusing position estimated based on a history of the processing result of the 2-image matching process is larger than a threshold value. Accordingly, the amount of additional movement is effectively determined only when the difference between the position of the focus lens and the focusing position estimated based on the history of the processing result of the 2-image matching process is larger than the threshold value.

In the first aspect, the focus control unit may determine the amount of additional movement only when the moving direction of the focus lens based on the contrast coincides with the moving direction of the focus lens based on the estimated focusing position. Accordingly, the amount of additional movement is effectively determined only when the moving direction based on the contrast coincides with the moving direction of the focus lens based on the estimated focusing position.

In the first aspect, the focus control unit may determine the amount of additional movement in the coinciding moving direction. Accordingly, the amount of additional movement in the coinciding moving direction is effectively determined.

In the first aspect, the focus control unit may calculate the amount of additional movement based on the difference. Accordingly, the amount of additional movement is effectively calculated based on the difference.

In the first aspect, the imaging apparatus may further include a posture detecting unit that detects a change in the posture of the imaging apparatus, and the focus control unit may determine the amount of additional movement without using the matching process result as the history when the detected change in the posture is larger than a threshold value. Accordingly, the amount of additional movement is effectively determined without the use of the matching processing result as the history when the detected change in the posture is larger than the threshold value.

In the first aspect, the focus control unit may determine the amount of additional movement without using the matching process result as the history when the difference between the luminance detection value in the first image and the luminance detection value in the second image is larger than a threshold value. Accordingly, the amount of additional movement is effectively determined without the use of the matching processing result as the history when the difference between the luminance detection value in the first image and the luminance detection value in the second image is larger than the threshold value.

In the first aspect, the focus control unit may determine the amount of additional movement without using the matching process result as the history when the difference between the aperture value at the time of the generation of the first image and the aperture value at the time of the generation of the second image is larger than a threshold value. Accordingly, the amount of additional movement is effectively determined without the use of the matching processing result as the history when the difference between the aperture value at the time of the generation of the first image and the aperture value at the time of the generation of the second image is larger than the threshold value.

In the first aspect, the imaging apparatus may further include a posture detecting unit that detects a change in the posture of the imaging apparatus, and the focus control unit may perform the focus control without using the processing result of the 2-image matching process when the detected change in the posture is larger than a threshold value. Accordingly, the focus control is effectively performed without the use of the processing result of the 2-image matching process when the detected change in the posture is larger than the threshold value.

In the first aspect, the focus control unit may perform the focus control without using the processing result of the 2-image matching process when the difference between the luminance detection value in the first image and the luminance detection value in the second image is larger than a threshold value. Accordingly, the focus control is effectively performed without the use of the processing result of the 2-image matching process when the difference between the luminance detection value in the first image and the luminance detection value in the second image is larger than the threshold value.

In the first aspect, the focus control unit may perform the focus control without using the processing result of the 2-image matching process when the difference between the aperture value at the time of the generation of the first image and the aperture value at the time of the generation of the second image is larger than a threshold value. Accordingly, the focus control is effectively performed without the use of the processing result of the 2-image matching process when the difference between the aperture value at the time of the generation of the first image and the aperture value at the time of the generation of the second image is larger than the threshold value.

Effects of the Invention

According to the present technique, an excellent effect can be achieved so as to perform fast focus control.

MODE FOR CARRYING OUT THE INVENTION

The following is a description of modes (hereinafter referred to as embodiments) for carrying out the present technique. Explanation will be made in the following order.

1. First Embodiment (Focus Control: Example in which the amount of additional movement of the focus lens is determined by using the processing result of a 2-image matching process when a contrast AF process is performed)

1. First Embodiment

[Example Internal Structure of an Imaging Apparatus]

Figure 1:
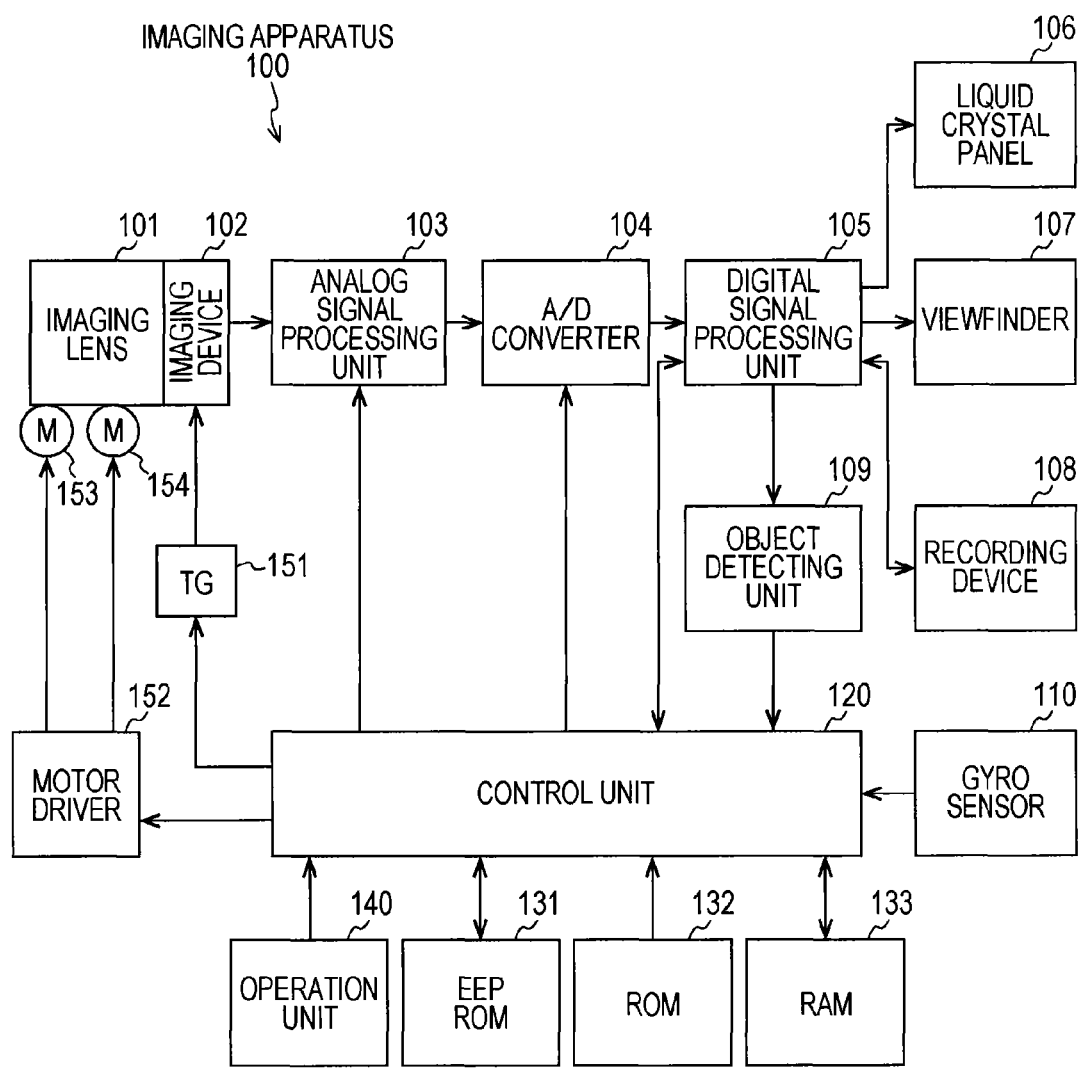
FIG. 1 is a block diagram showing an example internal structure of an imaging apparatus 100 in a first embodiment of the present technique.

FIG. 1 is a block diagram showing an example internal structure of an imaging apparatus 100 according to a first embodiment of the present technique.

The imaging apparatus 100 includes an imaging lens 101, an imaging device 102, an analog signal processing unit 103, an A/D (Analog/Digital) converter 104, and a digital signal processing unit 105. The imaging apparatus 100 also includes a liquid crystal panel 106, a viewfinder 107, a recording device 108, an object detecting unit 109, a gyro sensor 110, and a control unit 120. The imaging apparatus 100 also includes an EEPROM (Electrically Erasable and Programmable Read Only Memory) 131. The imaging apparatus 100 also includes a ROM (Read Only Memory) 132 and a RAM (Random Access Memory) 133. The imaging apparatus 100 also includes an operation unit 140, a TG (Timing Generator) 151, a motor driver 152, a focus lens drive motor 153, and a zoom lens drive motor 154. The imaging apparatus 100 is realized by a digital still camera or a digital video camera (such as a recorder with a camera) that can perform an AF (Auto Focus) process, for example.

The imaging lens 101 is a lens that gathers light from an object, and supplies the gathered light to the imaging device 102. The imaging lens 101 includes a zoom lens, a focus lens, an iris, a ND (Neutral Density) mechanism, a shift vibration-proof image-stabilizing lens, and the like. The zoom lens is a lens for continuously changing the focal length. The focus lens is a lens for focusing on the object. The iris is designed to change the aperture diameter. The ND mechanism is a mechanism for inserting a ND filter. The shift vibration-proof image-stabilizing lens is a lens for correcting jiggling of the hand of the user during an image capturing operation. The focus lens is driven by the focus lens drive motor 153, and moves back and force with respect to the object. In this manner, a focusing function is realized. The zoom lens is driven by the zoom lens drive motor 154, and moves back and force with respect to the object. In this manner, a zooming function is realized.

The imaging device 102 is a photoelectric conversion element that receives light entering from the object via the imaging lens 101, and converts the light into an electrical signal (image signal). The image signal (analog signal) generated through this conversion is supplied to the analog signal processing unit 103. That is, an optical image of the object that enters via the imaging lens 101 is formed in the imaging area of the imaging device 102, and the imaging device 102 performs an imaging operation in that situation, to generate an image signal (analog signal). The imaging device 102 is driven by the TG 151. The imaging device 102 may be a CCD (Charge Coupled Device), a CMOS (Complementary Metal Oxide Semiconductor), or the like.

Under the control of the control unit 120, the analog signal processing unit 103 performs analog processing such as denoising on the image signal (analog signal) supplied from the imaging device 102. The analog signal processing unit 103 supplies the image signal (analog signal) subjected to the analog processing, to the A/D converter 104.

Under the control of the control unit 120, the A/D converter 104 converts the image signal (analog signal) supplied from the analog signal processing unit 103 into a digital signal, and supplies the A/D-converted image signal (digital signal) to the digital signal processing unit 105.

Under the control of the control unit 120, the digital signal processing unit 105 performs digital processing such as gamma correction on the image signal (digital signal) supplied from the A/D converter 104, and supplies the digitally-processed image signal (digital signal) to respective components. For example, the digital signal processing unit 105 supplies the digitally-processed image signal (digital signal) to the liquid crystal panel 106 and the viewfinder 107 to display images. The digital signal processing unit 105 also performs a compressing process on the digitally-processed image signal (digital signal), and supplies the image data subjected to the compressing process (compressed image data), to the recording device 108 to record the image data.

The liquid crystal panel 106 is a display panel that displays respective images based on the image signal (image data) supplied from the digital signal processing unit 105. The liquid crystal panel 106 displays the image signal (image data) supplied from the digital signal processing unit 105 as a through image, for example. The liquid crystal panel 106 also displays image data recorded in the recording device 108 as a list image, for example. The liquid crystal panel 106 may be a display panel such as a LCD (Liquid Crystal Display) or an organic EL (Electro Luminescence) panel.

The viewfinder 107 is an electronic viewfinder (EVF) that displays respective images based on the image signal (image data) supplied from the digital signal processing unit 105.

The recording device 108 is a recording device that records the image signal (image data) supplied from the digital signal processing unit 105. The recording device 108 also supplies recorded image data to the digital signal processing unit 105. The recording device 108 may be included in the imaging apparatus 100, or may be detachable from the imaging apparatus 100. The recording device 108 may be a flash memory or a DV tape.

Under the control of the control unit 120, the object detecting unit 109 analyzes the image signal (image data) supplied from the digital signal processing unit 105, and detects the object included in the image. The detection result (detection information) is then output to the control unit 120. For example, the object detecting unit 109 detects the face of the person included in the image corresponding to the image signal (image data) supplied from the digital signal processing unit 105, and outputs face information about the detected face to the control unit 120. The face detection method may be a method of detecting a face by performing matching between a template in which luminance distribution information about the face is recorded and an actual image (see JP 2004-133637 A, for example), a method of detecting a face based on the feature quantity of the skin-colored portion or the face of the person included in the image data, or the like. The face detection information contains the position and the size of the detected face in the image. The object detecting unit 109 also has the function of recognizing the object that is following AF with respect to the image signal (image data) supplied from the digital signal processing unit 105.

The gyro sensor 110 detects the angular velocity of the imaging apparatus 100, and outputs the detected angular velocity to the control unit 120. Since the angular velocity of the imaging apparatus 100 is detected by the gyro sensor 110, a change of the posture of the imaging apparatus 100 is detected. A sensor (such as an acceleration sensor) other than a gyro sensor may be used to detect acceleration, motion, tilt, and the like of the imaging apparatus 100, and detect the posture or a change of the posture of the imaging apparatus 100 based on the results of the detection.

The control unit 120 includes a CPU (Central Processing Unit), and controls respective processes to be performed by the imaging apparatus 100 based on a program stored in the ROM 132. For example, the control unit 120 performs the respective processes to realize respective functions such as an AF function to focus on the object, an AE (Auto Exposure) function to adjust brightness, a WB (White Balance) function to perform white balancing. The control unit 120 also outputs control information about the focus lens depending on the focus following in accordance with AF, a manual operation, or a zooming operation, control information about the zoom lens in accordance with a zooming operation, and the like to the motor driver 152.

The EEPROM 131 is a nonvolatile memory that is capable of holding data while the imaging apparatus 100 is off, and stores image data, various kinds of auxiliary information, and various kinds of setting information.

The ROM 132 is a memory that stores the program, the operational parameters, and the like to be used by the control unit 120.

The RAM 133 is a working memory that stores a program to be used by the control unit 120, parameters that vary at the time of execution of the program, and the like.

The operation unit 140 receives an operation input from a user, such as a REC button (recording button) operation, a zooming operation, or a touch panel operation, and supplies the content of the received operation input to the control unit 120.

Under the control of the control unit 120, the TG 151 generates a drive control signal for driving the imaging device 102, and causes the imaging device 102 to be driven.

Under the control of the control unit 120, the motor driver 152 drives the focus lens drive motor 153 and the zoom lens drive motor 154 to drive respective lenses (the focus lens, the zoom lens, and the like). Specifically, the motor driver 152 converts control signals (control information for driving the respective motors) output from the control unit 120 into voltages, and outputs the respective converted voltages to the focus lens drive motor 153 and the zoom lens drive motor 154. The motor driver 152 then drives the respective motors to drive the respective lenses.

The focus lens drive motor 153 is a motor that moves the focus lens based on the voltage that is output from the motor driver 152. The zoom lens drive motor 154 is a motor that moves the zoom lens based on the voltage that is output from the motor driver 152.

[Example Functional Structure of the Imaging Apparatus]

Figure 2:
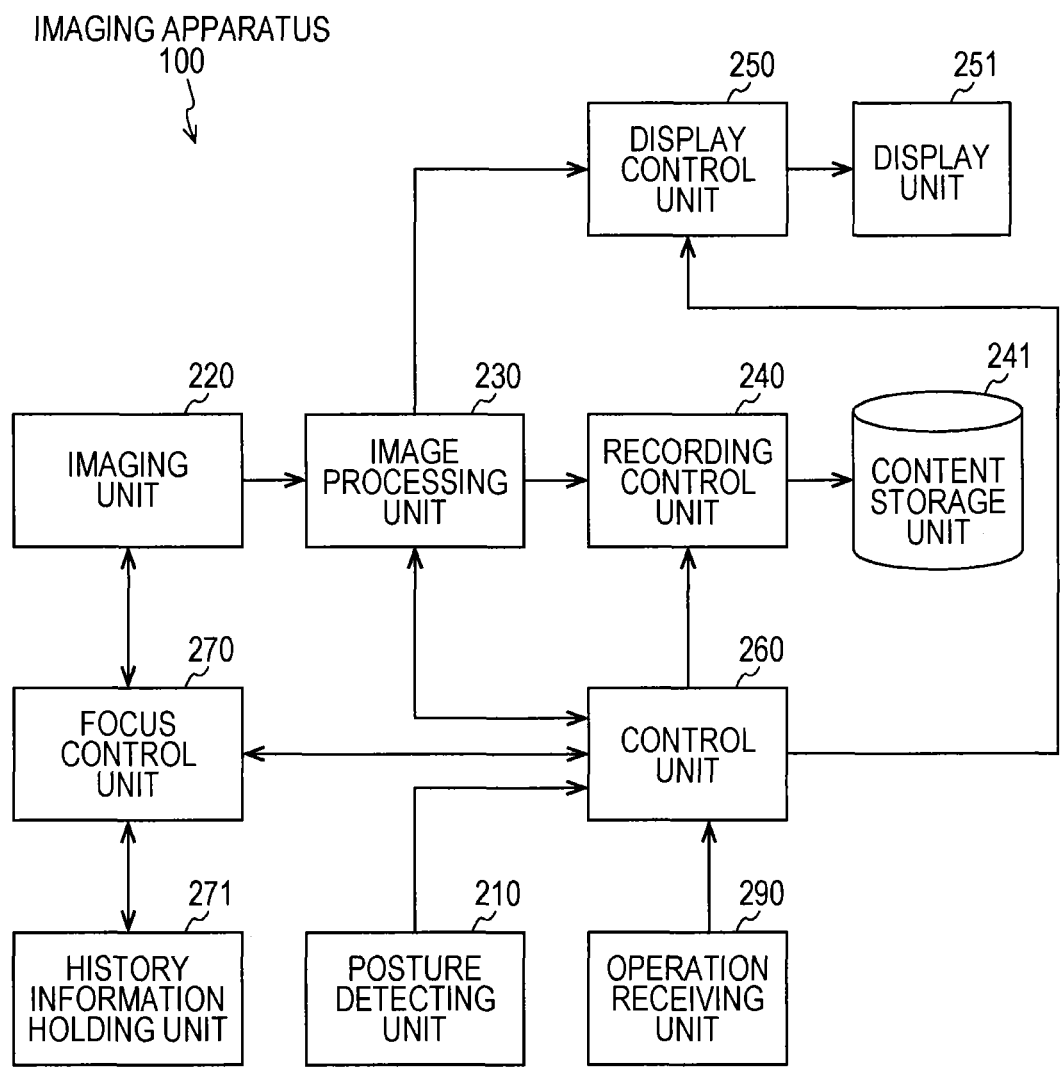
FIG. 2 is a block diagram showing an example functional structure of the imaging apparatus 100 in the first embodiment of the present technique.

FIG. 2 is a block diagram showing an example functional structure of the imaging apparatus 100 according to the first embodiment of the present technique.

The imaging apparatus 100 includes a posture detecting unit 210, an imaging unit 220, an image processing unit 230, a recording control unit 240, a content storage unit 241, a display control unit 250, and a display unit 251. The imaging apparatus 100 also includes a control unit 260, a focus control unit 270, a history information holding unit 271, and an operation receiving unit 290.

The posture detecting unit 210 detects a change in the posture (angular velocity) of the imaging apparatus 100, and outputs information (posture information) about the detected change in the posture (angular velocity) to the control unit 260. This posture information is supplied to the focus control unit 270 via the control unit 260. The posture detecting unit 210 corresponds to the gyro sensor 110 shown in FIG. 1.

The imaging unit 220 generates image data (an image signal), and outputs the generated image data to the image processing unit 230 and the focus control unit 270. The imaging unit 220 also moves the focus lens to realize the AF function under the control of the focus control unit 270. The imaging unit 220 corresponds to the imaging lens 101, the imaging device 102, the focus lens drive motor 153, and the zoom lens drive motor 154 shown in FIG. 1, for example.

In accordance with an instruction from the control unit 260, the image processing unit 230 performs various kinds of image processing on the image data output from the imaging unit 220, and outputs the image data subjected to the various kinds of image processing, to the recording control unit 240, the display control unit 250, and the control unit 260. The image processing unit 230 corresponds to the analog signal processing unit 103, the A/D converter 104, and the digital signal processing unit 105 shown in FIG. 1, for example.

In accordance with an instruction from the control unit 260, the recording control unit 240 performs recording control on the content storage unit 241. For example, the recording control unit 240 records the image data output from the image processing unit 230 as image content (a still image file or a moving image file) in the content storage unit 241. The recording control unit 240 corresponds to the digital signal processing unit 105 and the control unit 260 shown in FIG. 1, for example.

The content storage unit 241 is a recording medium that stores various kinds of information (such as image content) under the control of the recording control unit 240. The content storage unit 241 corresponds to the recording device 108 shown in FIG. 1, for example.

The display control unit 250 causes the display unit 251 to display the image output from the image processing unit 230 in accordance with an instruction from the control unit 260. The display control unit 250 corresponds to the digital signal processing unit 105 and the control unit 120 shown in FIG. 1, for example.

The display unit 251 is a display panel that displays respective images under the control of the display control unit 250. The display unit 251 corresponds to the liquid crystal panel 106 and the viewfinder 107 shown in FIG. 1, for example.

The control unit 260 controls the respective components in the imaging apparatus 100 based on a control program stored in a memory (not shown). The control unit 260 corresponds to the control unit 120 shown in FIG. 1, for example.

The focus control unit 270 performs an auto focus process by moving the focus lens in a case where an imaging mode is set. For example, the focus control unit 270 performs focus control based on the contrast in an image generated by the imaging unit 220 and the processing result of a 2-image matching process. Specifically, when moving the focus lens in a contrast AF process, the focus control unit 270 determines the amount of additional movement of the focus lens based on the processing result of a 2-image matching process. The 2-image matching process is a process to be performed with the use of two images that are generated by the imaging unit 220 with the focus lens being located in different positions. The 2-image matching process will be described later in detail, with reference to FIGS. 4 and 5. The determination on the amount of additional movement will be described later in detail, with reference to FIGS. 6 through 9 and others. The focus control unit 270 corresponds to the control unit 120 and the motor driver 152 shown in FIG. 1, for example.

The history information holding unit 271 is a holding unit that sequentially holds histories of the results of matching processes performed by the focus control unit 270. The history information holding unit 271 corresponds to the RAM 133 shown in FIG. 1, for example.

The operation receiving unit 290 is an operation receiving unit that receives an operation that is input by a user, and outputs control signals (operation signals) in accordance with the contents of the received operation, to the control unit 260. The operation receiving unit 290 corresponds to the operation unit 140 shown in FIG. 1, for example.

[Example Relationship Between Contrast AF and an Object]

Figure 3:
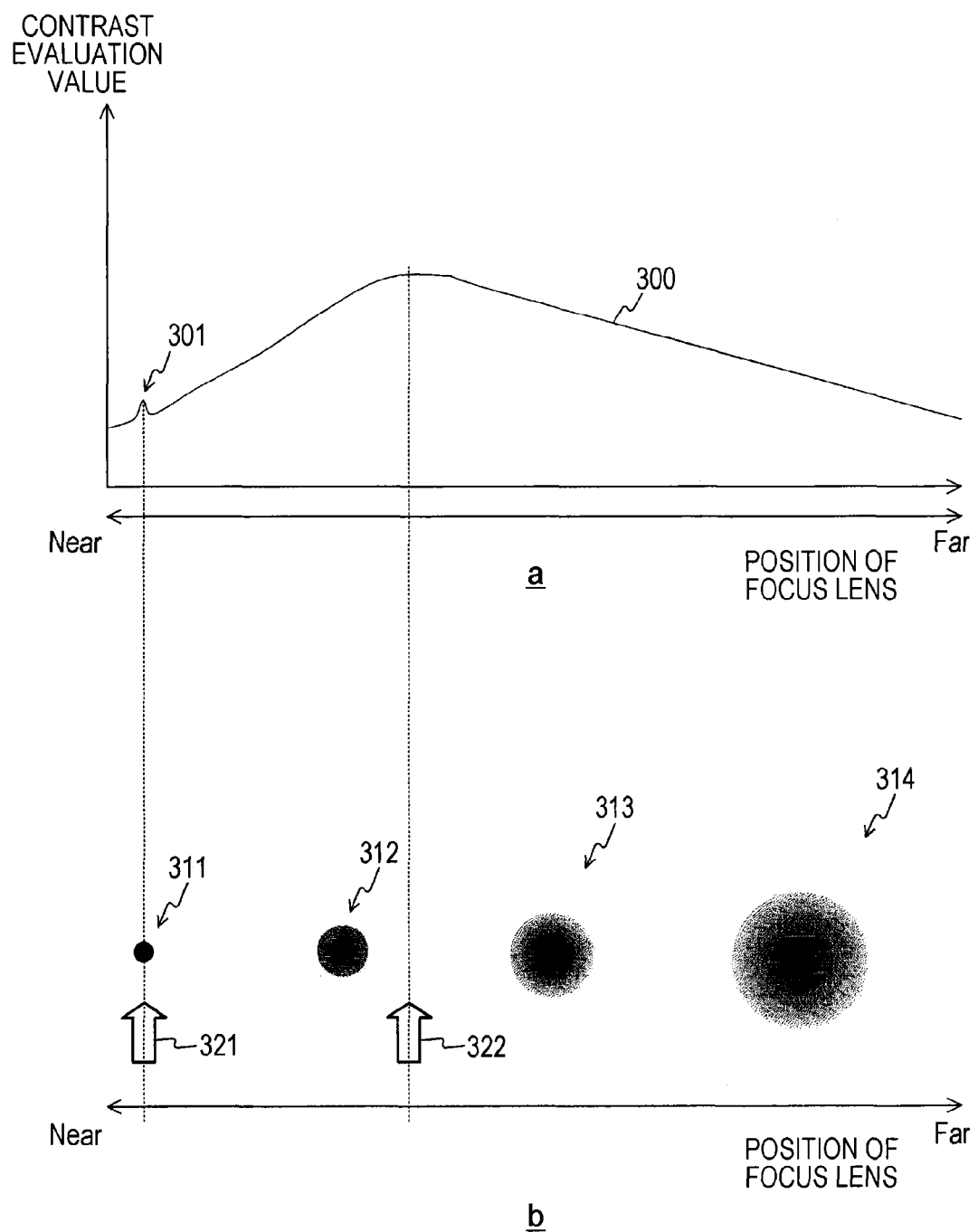
FIG. 3 is a diagram showing the relationship between contrast evaluation values and captured images when the focus control unit 270 performs a contrast AF process in the first embodiment of the present technique.

FIG. 3 is a diagram showing an example relationship between contrast evaluation values and captured images in a case where the focus control unit 270 performs a contrast AF process in the first embodiment of the present technique. In FIG. 3, an example relationship in a case where a high-luminance point source is included in an object is shown. An object including a high-luminance point source is an object in a scene where a point of strong light exists in darkness, for example.

In FIG. 3, "a" shows the relationship between the position of the focus lens and contrast evaluation values (AF evaluation values). In FIG. 3, "b" shows the relationship between the position of the focus lens and captured images (images including a high-luminance point source).

The contrast AF process is now described. At present, imaging apparatuses (such as digital video cameras (recorders with cameras) that have the function of automatically focusing on a principal object (an AF function) during a moving image capturing operation are widely used. This AF function may be a contrast AF function that performs focus control based on contrast measurement, for example. With this contrast AF function, the intensity of the contrast in image data acquired via a lens is determined, and the position of the focus lens is determined.

Specifically, with the contrast AF function, focus control is performed by using intensity information about the contrast in an image acquired in the imaging apparatus 100. For example, a specific area in a captured image is set as a signal acquisition area (a spatial frequency extraction area) for focus control. This specific area is also referred to as a range measurement frame (frequency detection frame). As the contrast in the specific area becomes higher, the specific area is determined to be in focus. As the contrast becomes lower, the specific area is determined to be out of focus. In view of this, the contrast AF function drives and adjusts the focus lens to such a position as to achieve the highest contrast.

Specifically, the high-frequency component of the specific area is extracted, integral data of the extracted high-frequency component is generated, and the intensity of the contrast is determined based on the generated integral data of the high-frequency component.

That is, images are acquired while the focus lens is moved from one position to other positions, and a filtering process (such as high-pass filtering) is performed on the luminance signals of the respective images, to obtain AF evaluation values indicating the contrast intensities of the respective images.

In a case where there is an object that comes into focus in a position where the focus lens exists, the AF evaluation value with respect to the position of the focus lens draws a curve. The position of the peak of this curve (or the position where the contrast value of the image becomes largest) is the focusing position.

As described above, in the contrast AF, a focusing operation is performed based only on the information about an image formed by an imaging device (an imager), and therefore, there is no need to provide a range measuring optical system as well as an imaging optical system in the imaging apparatus. In view of this, the contrast AF is widely used in imaging apparatuses such as digital still cameras and digital video cameras.

However, with the contrast AF, correct focusing might not be performed when the object satisfies a certain condition, and a long period of time might be required before focusing. When the object satisfies a certain condition, a high-luminance point source is included in the object, as shown in "a" in FIG. 3, for example.

As described above, with the contrast AF, as the focus lens approaches the focusing position, the contrast evaluation value becomes higher. As the focus lens moves further away from the focusing position, the contrast evaluation value becomes lower. However, when a high-luminance point source is included in the object as shown in "a" in FIG. 3, such a relationship might not be established. For example, as shown in "b" in FIG. 3, the areas of high-luminance point sources 311 through 314 become larger while maintaining edges, as the focus lens moves further away from the focusing position (arrows 301 and 321). Therefore, a position (an arrow 322) that is not the focusing position (the arrow 321) of the focus lens might be the position of the peak of the curve 300, and be determined to be the focusing position, as shown in "b" in FIG. 3, for example. As a result, a long period of time is required before focusing, and there is a possibility that focus control cannot be performed at a higher speed.

Also, as a method of estimating the focusing position, there is a focusing position estimation method using a 2-image matching process (see JP 2011-128623 A, for example). This focusing position estimation method using a 2-image matching process will be described below in detail, with reference to FIGS. 4 and 5.

[Example of the 2-Image Matching Process]

Figure 4:
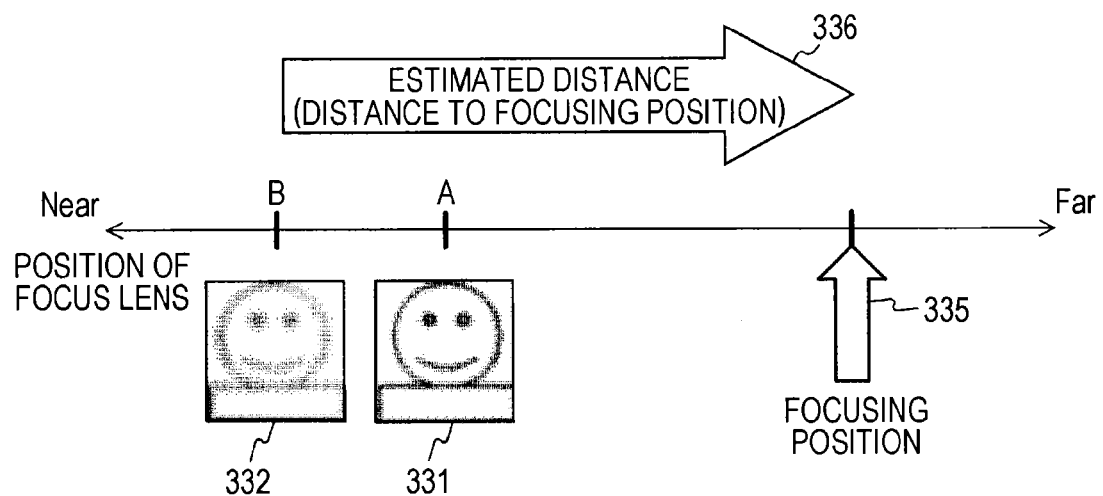
FIG. 4 is a diagram schematically showing an example of a 2-image matching process to be performed by the focus control unit 270 in the first embodiment of the present technique.

FIG. 4 is a diagram schematically showing an example of the 2-image matching process to be performed by the focus control unit 270 in the first embodiment of the present technique. The abscissa axis shown in FIG. 4 is the axis indicating the position of the focus lens.

The 2-image matching process is a process to estimate a focusing position by matching two images that are generated by changing the position of the focus lens (see JP 2011-128623 A, for example). The 2-image matching AF process is also an AF process to move the focus lens based on the focusing position estimated by the 2-image matching process (see JP 2011-128623 A, for example).

In FIG. 4, images 331 and 332 generated by the imaging unit 220 are shown in the positions of the focus lens at the time of the generation. The image 331 is generated in a position A of the focus lens, and the image 332 is generated in a position B of the focus lens. The image 331 is clearer than the image 332.

In the 2-image matching process, the distance (an arrow 336) to the focusing position (an arrow 335) is estimated by using the two images 331 and 332 generated in the two different focus lens positions. This calculation is repeated several times, to increase precision.

Here, the change in blurring between the images 331 and 332 can be modeled by an image conversion function P expressed by the equation (1) shown below. In the equation (1), fA represents the image 331, and fB represents the image 332.

$$fA * P = fB \qquad \text{Equation (1)}$$

Here, * represents a two-dimensional convolution. Also, the image conversion function P can be approximated by using a series of convolutions with a blurring kernel K, as shown below in the equation (2).

$$P = K * K * K * \ldots * K \qquad \text{Equation (2)}$$

As the blurring kernel K, the following matrix may be used, for example.

$$K = \frac{1}{48} \begin{pmatrix} 1 & 4 & 1 \\ 4 & 48 & 4 \\ 1 & 4 & 1 \end{pmatrix} \qquad \text{[Mathematical Formula 1]}$$

Figure 5:
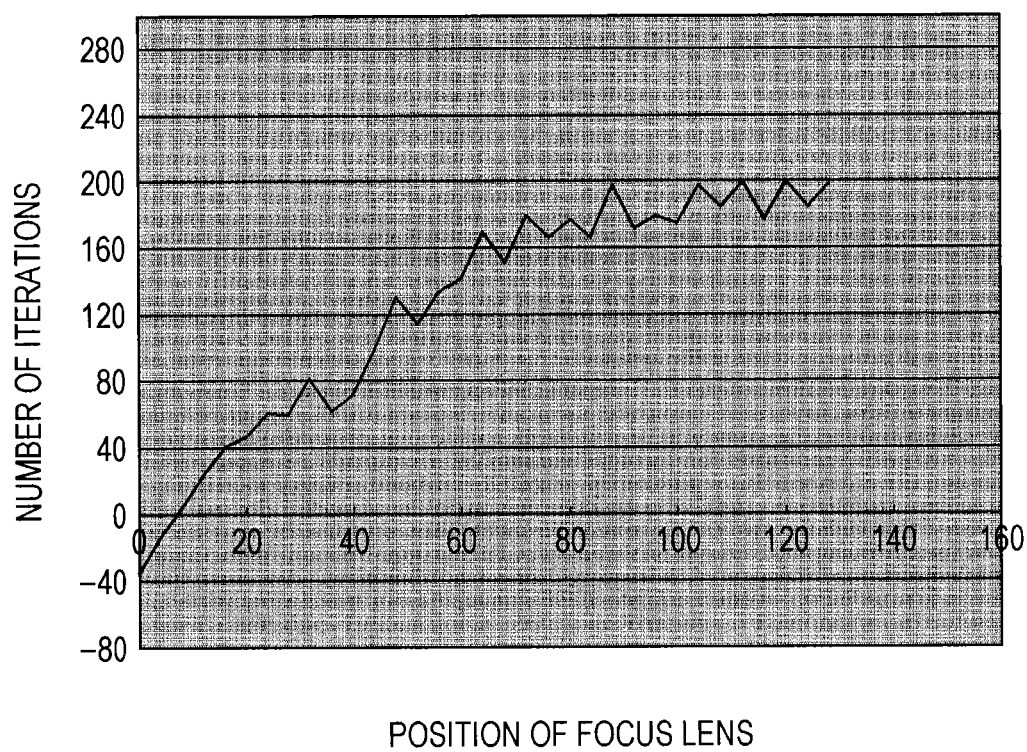
FIG. 5 is a diagram showing a fitting curve representing the correlation between the distance from the focusing position of the focus lens and the calculation results of the 2-image matching process in the first embodiment of the present technique.

Here, the amount of the blurring difference between the images 331 and 332 can be measured by counting the number of convolutions in the equation (2). That is, the amount of the blurring difference can be measured by counting the number of convolutions used until the images 331 and 332 become the same. An example of the result of this measurement calculation is shown in FIG. 5. When measurement is actually conducted, a difference between two images is preferably obtained by using iterative processing.

[Example of a Fitting Curve]

FIG. 5 is a diagram showing a fitting curve that shows the correlation between the distance from the focusing position of the focus lens in the first embodiment of the present technique and the calculation result of the 2-image matching process. In FIG. 5, the abscissa axis indicates the position of the focus lens, and the ordinate axis indicates the number of iterations (the number of convolutions in the equation (2)).

Here, the number of iterations indicated by the ordinate axis shown in FIG. 5 (the number of convolutions in the equation (2)) is the value corresponding to the distance to the focusing position of the focus lens. Specifically, in a case where the number of iterations indicated by the ordinate axis shown in FIG. 5 is "0", the position of the focus lens is the focusing position. For example, in FIG. 5, a position near "4" on the abscissa axis is the position where the number of iterations is "0" on the ordinate axis. As the number of iterations moves further away from "0", the position of the focus lens moves further away from the focusing position. In this case, the positive and negative values of the number of iterations indicate the moving directions of the focus lens.

The images to be used in the 2-image matching process are now described. When the 2-image matching process is performed, central areas (certain proportions) of captured images can be extracted during the AF of a moving image, and be used in the calculation. Instead of the central areas of captured images, designated areas (areas (such as rectangular areas) in captured images) designated by the user of the imaging apparatus 100 may be extracted, and be used in the calculation. In this case, the user can focus on a particularly desired object. However, in the peripheral portions of the captured images, the precision of focusing position estimation might become lower due to a phenomenon called lens aberration. Therefore, there is a possibility that the precision of determination as to switching between the contrast AF mode and the 2-image matching AF mode will become lower, or the time required for the AF in the 2-image matching AF mode will become longer. In view of this, areas close to the centers of captured images are preferably designated as the designated areas.

In the 2-image matching AF process, a certain time interval is also required to acquire two images. Therefore, the precision of focusing position estimation might become lower in a situation where the user is moving the imaging apparatus 100 (a situation where panning or tilting is being performed, for example), a situation where the object is moving or transforming, or the like.

In the 2-image matching AF process, the difference between the focus lens positions of two images is also used. Therefore, in a situation where the size of the aperture of the imaging unit 220 (the imaging lens 101) is changing by virtue of an automatic exposure adjustment function or the like, the precision of focusing position estimation might become lower.

Therefore, if the focusing position is estimated through a 2-image matching process in the above described situations, a wrong position might be estimated to be the focusing position.

In view of this, in the first embodiment of the present technique, appropriate focus control is performed in such situations.

[Example of an AF Process]

Figure 6:
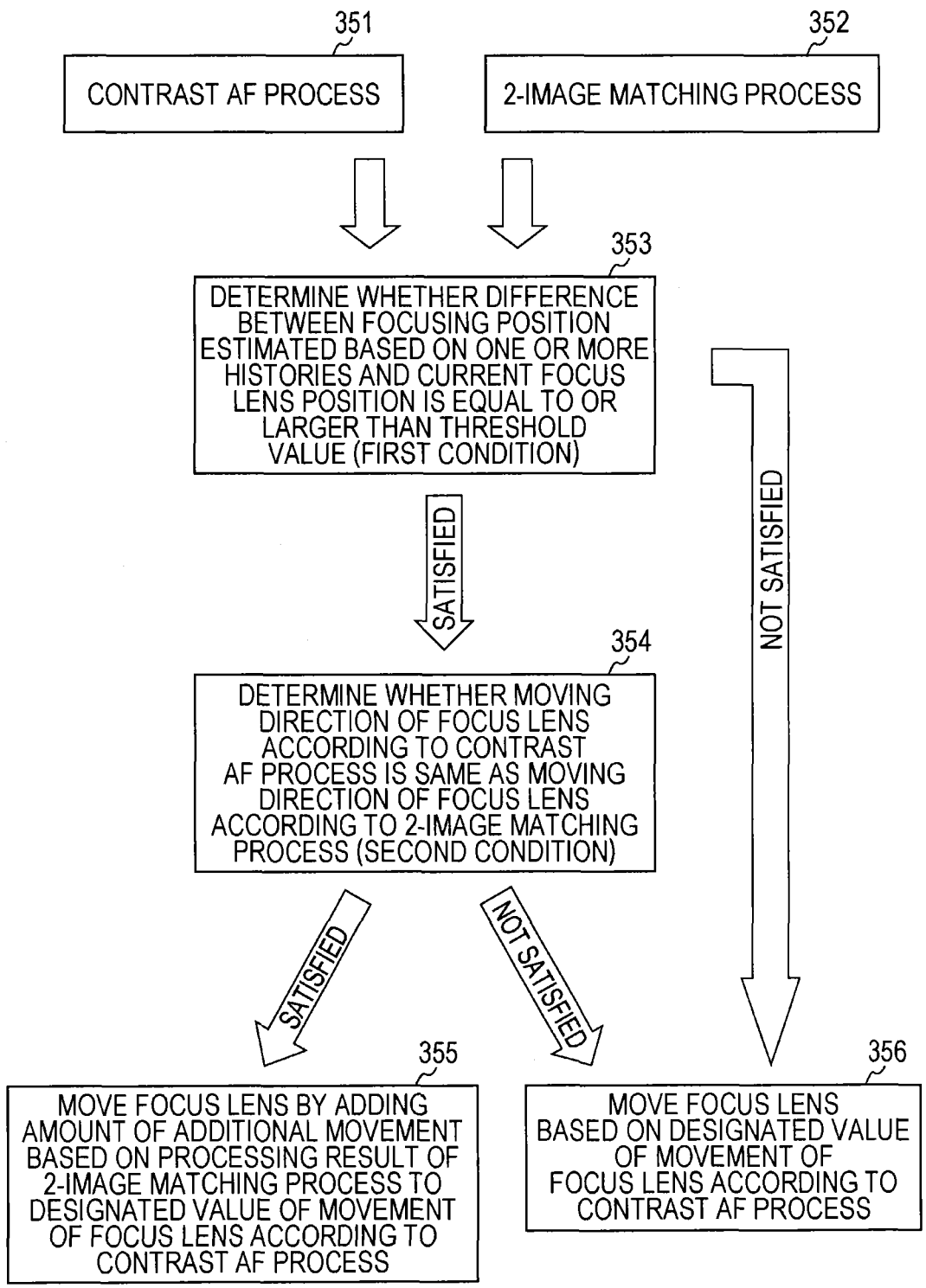
FIG. 6 is a diagram schematically showing an example flow of an AF process to be performed by the focus control unit 270 in the first embodiment of the present technique.

FIG. 6 is a diagram schematically showing an example flow of an AF process to be performed by the focus control unit 270 in the first embodiment of the present technique. In FIG. 6, an example flow of an AF process to be performed in a case where a moving image capturing mode is set is shown.

In a case where the moving image capturing mode is set, the focus control unit 270 performs a 2-image matching process (352), as well as a contrast AF process (351). That is, during the contrast AF process (351), a focusing position is estimated by the 2-image matching process (352). Histories of the matching processing results (estimated focusing positions) of the 2-image matching process are sequentially held in the history information holding unit 271.

The focus control unit 270 then determines whether a first condition is satisfied (353). Here, the first condition is that the difference between an estimated focusing position calculated by combining one or more histories and the current position of the focus lens is equal or larger than a threshold value.

The estimated focusing position calculated by combining one or more histories (an estimated focusing position calculated by a weighted averaging method) is calculated according to the equation (3) shown below.

[Mathematical Formula 2]

$$\bar{d} = \frac{\sum_{i=1}^{n}\left(\frac{d_i}{\sigma_i^2}\right)}{\sum_{i=1}^{n}\left(\frac{1}{\sigma_i^2}\right)}$$

Equation (3)

Here, the N non-biased processing results $d_1, \ldots, d_N$ of the 2-image matching process are obtained with $d_i$ through N ($\mu$, $\sigma_i^2$). N represents the number of pairs of images (two images) used in the 2-image matching process, and $\mu$ represents the distance to the actual focusing position. The "maximum likelihood estimator (MLE)" of $\mu$ is determined by weighted averaging, and $\sigma_i^2$ represents the distribution.

If the first condition is satisfied (353), the focus control unit 270 determines whether a second condition is satisfied (354). Here, the second condition is that the moving direction of the focus lens according to the contrast AF process coincides with the moving direction of the focus lens according to the 2-image matching process. The moving direction of the focus lens according to the 2-image matching process can be determined based on the above described estimated focusing position calculated by combining one or more histories.

If the second condition is satisfied (354), the focus control unit 270 performs focus control by adding an amount of additional movement (a predetermined value) to the movement of the focus lens according to the contrast AF process (355). For example, the absolute value of the amount of additional movement can be calculated in accordance with the difference between the estimated focusing position calculated by combining one or more histories and the current position of the focus lens. Also, the adding direction can be the above coinciding moving direction. For example, the value of additional movement can be made to increase as the difference becomes larger. As the amount M1 of additional movement, a value calculated according to the equation (4) shown below can be used, for example.

$$M1 = A \times S^B \tag{4}$$

Here, S represents the difference between the estimated focusing position calculated by combining one or more histories and the current position of the focus lens. A and B represent positive real numbers (that is, 0<A, 0<B). For example, 0<A<1, and B=1. More specifically, A may be approximately 0.1 to 0.2, for example.

If the second condition is satisfied (354), the focus control unit 270 may perform focus control by adding a value according to the processing result of the 2-image matching process to the designated velocity of the focus lens according to the contrast AF process.

If the second condition is not satisfied (354), the focus control unit 270 performs focus control by performing the contrast AF process without using the processing result of the 2-image matching process (356). That is, a conventional contrast AF process is performed.

As described above, when the focus lens is located far from the focusing position, the focus lens can be moved at a higher speed through focus control. When the focus lens is located in the vicinity of the focusing position, only the contrast AF process is performed, and accordingly, focusing can be performed with even higher precision.

Although the amount of additional movement is determined in accordance with the difference between an estimated focusing position and the position of the focus lens in this example, the amount of additional movement may be a fixed value.

As described above, the focus control unit 270 determines the amount of additional movement only when the difference between the position of the focus lens and a focusing position estimated based on histories of processing results of the 2-image matching process is larger than a threshold value. In this case, the focus control unit 270 determines the amount of additional movement only when the moving direction of the focus lens based on the contrast coincides with the moving direction of the focus lens based on the estimated focusing position. For example, the focus control unit 270 determines the amount of additional movement in the above coinciding moving direction. Also, the focus control unit 270 calculates the amount of additional movement based on the difference.

[Example of Determination as to Whether the 2-Image Matching Process is Necessary with the Use of Angular Velocities]

Figure 7:
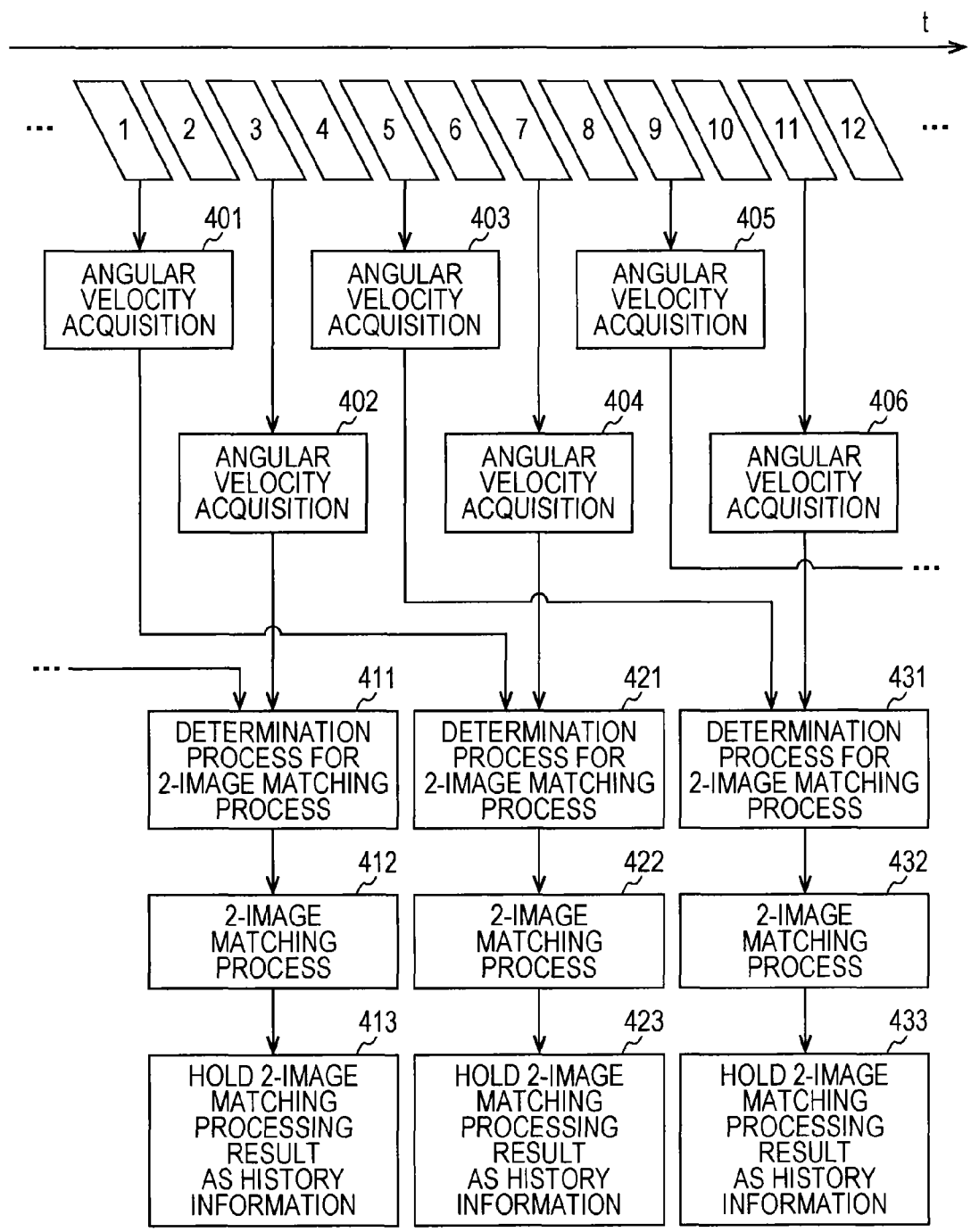
FIG. 7 is a diagram schematically showing a flow of a determination process to be performed by the focus control unit 270 to determine whether the 2-image matching process is necessary in the first embodiment of the present technique.

FIG. 7 is a diagram schematically showing a flow of a determination process to be performed by the focus control unit 270 to determine whether the 2-image matching process is necessary in the first embodiment of the present technique.

In FIG. 7, images 1 through 12 generated by the imaging unit 220 are shown in chronological order. The abscissa axis shown in FIG. 7 indicates the temporal axis. In FIG. 7, the images 1 through 12 are linked to respective processes (401 through 406, 411 through 413, and the like) by arrows that represent the relationships among them.

During a moving image capturing operation, the user might perform panning or tilting. However, in cases where the imaging apparatus 100 is moving due to panning, tilting, or the like (or where the optical axis direction differs between two images) in the 2-image matching process, a wrong focusing position estimation result is often output.

Therefore, when the two images to be used in the 2-image matching process are acquired, the posture detecting unit 210 (the gyro sensor 110) detects a change in posture (angular velocity) (401 through 406). The focus control unit 270 then determines whether the change in posture (angular velocity) detected by the posture detecting unit 210 (the gyro sensor 110) is equal to or larger than a threshold value (a determination process for the 2-image matching process) (411, 421, and 431).

If the change in posture (angular velocity) is smaller than the threshold value, the focus control unit 270 performs the 2-image matching process by using the two images corresponding to the times of the acquisitions of the angular velocities used in the comparison (412, 422, and 432). The focus control unit 270 then causes the history information holding unit 271 to hold the processing result of the 2-image matching process as history information (413, 423, and 433).

If the change in posture (angular velocity) is equal to or larger than the threshold value, on the other hand, the focus control unit 270 does not use the two images corresponding to the times of the acquisitions of the angular velocities used in the comparison to perform the 2-image matching process (412, 422, and 432). That is, the focus control unit 270 determines the amount of additional movement without using the matching processing result as the history when the change in posture (angular velocity) is larger than the threshold value (0, for example).

The threshold value for the change in posture (angular velocity) preferably becomes higher as the angle of view becomes wider. However, when the threshold value is set, it is preferable to take other conditions (such as an image stabilization condition) into consideration.

Also, the focus control unit 270 may perform focus control without using the processing result of the 2-image matching process when the change in posture (angular velocity) is larger than the threshold value.

[Example of Determination as to Whether the 2-Image Matching Process is Necessary with the Use of Luminance Detection Values]

Figure 8:
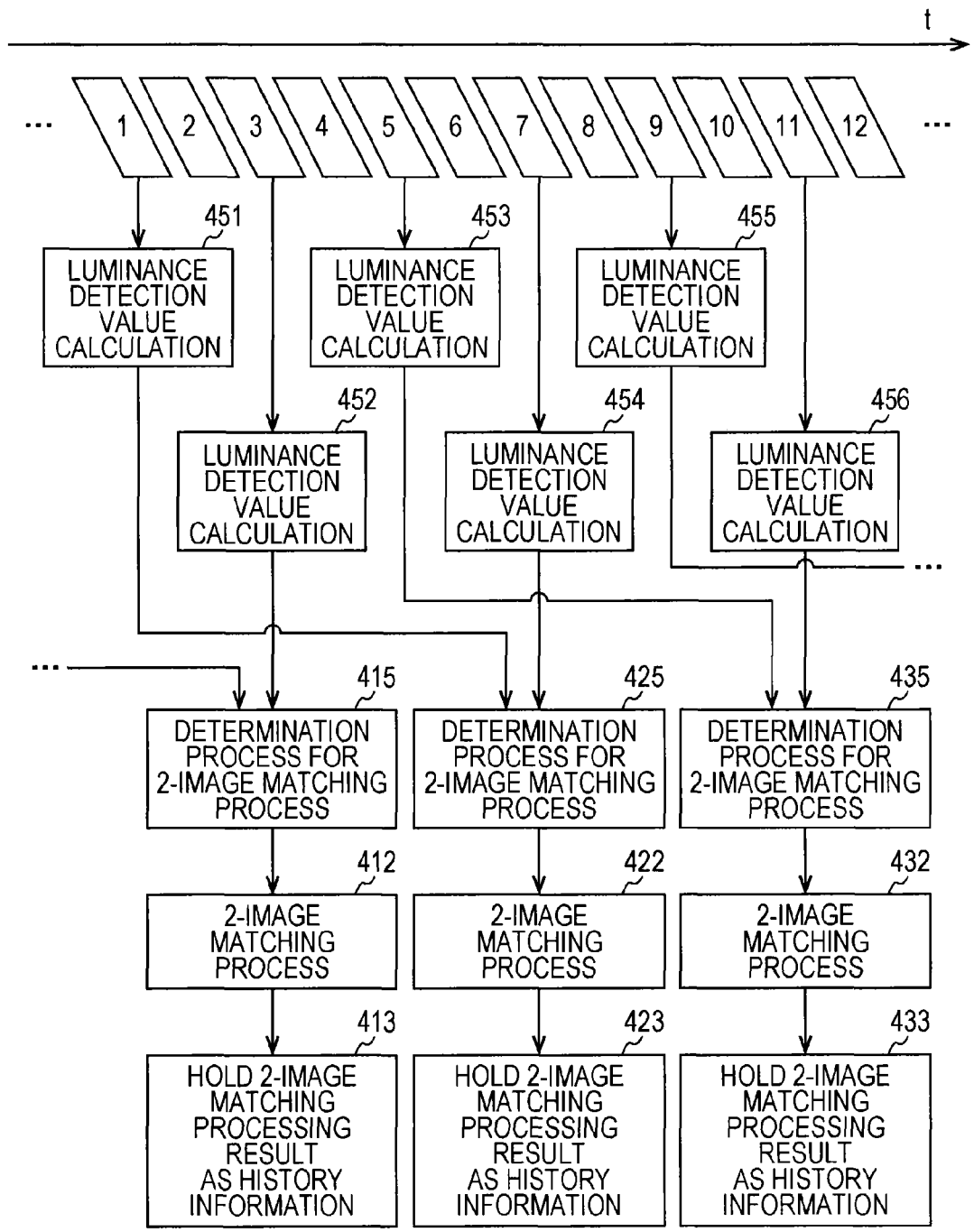
FIG. 8 is a diagram schematically showing a flow of a determination process to be performed by the focus control unit 270 to determine whether the 2-image matching process is necessary in the first embodiment of the present technique.

FIG. 8 is a diagram schematically showing a flow of a determination process to be performed by the focus control unit 270 to determine whether the 2-image matching process is necessary in the first embodiment of the present technique.

In FIG. 8, images 1 through 12 generated by the imaging unit 220 are shown in chronological order. The abscissa axis shown in FIG. 8 indicates the temporal axis. In FIG. 8, the images 1 through 12 are linked to respective processes (451 through 456, 415, 425, 435, and the like) by arrows that represent the relationships among them. The respective processes (412, 413, 422, 423, 432, and 433) shown in FIG. 8 are equivalent to the respective processes (412, 413, 422, 423, 432, and 433) shown in FIG. 7. Therefore, those processes are denoted by the same reference numerals as those used in FIG. 7, and part of the explanation of them will not be repeated herein.

During a moving image capturing operation, the object might move or transform. However, in cases where the position or the shape of the object differs between the two images in the 2-image matching process, a wrong focusing position estimation result is often output.

Therefore, when the two images to be used in the 2-image matching process are acquired, the focus control unit 270 calculates the luminance detection values in the images generated by the imaging unit 220 (451 through 456). The focus control unit 270 then determines whether the difference between the calculated two luminance detection values is equal to or larger than a threshold value (a determination process for the 2-image matching process) (415, 425, and 435). A luminance detection value is the total value or the average value of the luminance values in the detection frame in an image.

If the difference between the two luminance detection values is smaller than the threshold value, the object can be determined not to have moved or transformed. Therefore, the focus control unit 270 performs the 2-image matching process by using the two images corresponding to the times of the calculations of the two luminance detection values (412, 422, and 432). The focus control unit 270 then causes the history information holding unit 271 to hold the processing result of the 2-image matching process as history information (413, 423, and 433).

If the difference between the two luminance detection values is equal to or larger than the threshold value, on the other hand, the object can be determined to have moved or transformed. Therefore, the focus control unit 270 does not use the two images corresponding to the times of the calculations of the two luminance detection values in the 2-image matching process (412, 422, and 432). That is, the focus control unit 270 determines the amount of additional movement without using the matching processing result as the history when the difference between the two luminance detection values is larger than the threshold value.

Also, the focus control unit 270 may perform focus control without using the processing result of the 2-image matching process when the difference between the two luminance detection values is larger than the threshold value.

[Example of Determination as to Whether the 2-Image Matching Process is Necessary with the Use of Aperture Values]

Figure 9:
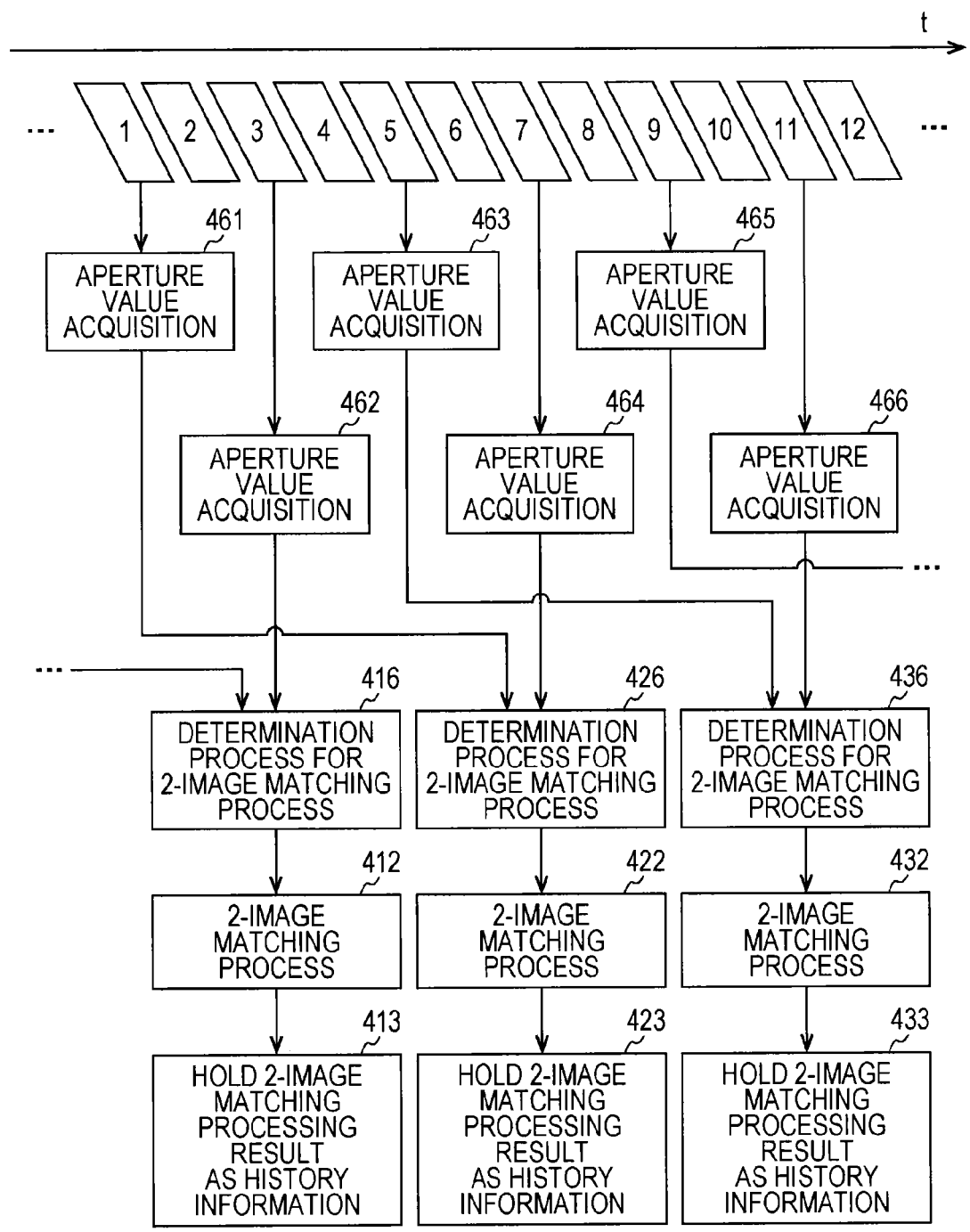
FIG. 9 is a diagram schematically showing a flow of a determination process to be performed by the focus control unit 270 to determine whether the 2-image matching process is necessary in the first embodiment of the present technique.

FIG. 9 is a diagram schematically showing a flow of a determination process to be performed by the focus control unit 270 to determine whether the 2-image matching process is necessary in the first embodiment of the present technique.

In FIG. 9, images 1 through 12 generated by the imaging unit 220 are shown in chronological order. The abscissa axis shown in FIG. 9 indicates the temporal axis. In FIG. 9, the images 1 through 12 are linked to respective processes (461 through 466, 416, 426, 436, and the like) by arrows that represent the relationships among them. The respective processes (412, 413, 422, 423, 432, and 433) shown in FIG. 9 are equivalent to the respective processes (412, 413, 422, 423, 432, and 433) shown in FIG. 7. Therefore, those processes are denoted by the same reference numerals as those used in FIG. 7, and part of the explanation of them will not be repeated herein.

During a moving image capturing operation, the size of the aperture might change due to an automatic exposure control function or the like. Here, the 2-image matching process is performed to estimate the focusing position by using the blurring levels in images. Therefore, in cases where there is a difference in the shape of the point-spread function or the focal depth between the two images, a wrong focusing position estimation result is often output as in the case where, for example, the size of the aperture changes.

Therefore, when the two images to be used in the 2-image matching process are acquired, the focus control unit 270 acquires the aperture values (F values) of the imaging unit 220 (461 through 466). The focus control unit 270 then determines whether the difference between the acquired two aperture values is equal to or larger than a threshold value (a determination process for the 2-image matching process) (416, 426, and 436).

If the difference between the two aperture values is smaller than the threshold value, the focus control unit 270 performs the 2-image matching process by using the two images corresponding to the times of the acquisitions of the two aperture values (412, 422, and 432). The focus control unit 270 then causes the history information holding unit 271 to hold the processing result of the 2-image matching process as history information (413, 423, and 433).

If the difference between the two aperture values is equal to or larger than the threshold value, on the other hand, the focus control unit 270 does not use the two images corresponding to the times of the calculations of the two aperture values in the 2-image matching process (412, 422, and 432). That is, the focus control unit 270 determines the amount of additional movement without using the matching processing result as the history when the difference between two aperture values is larger than the threshold value (0, for example).

Also, the focus control unit 270 may perform focus control without using the processing result of the 2-image matching process when the difference between the two aperture values is larger than the threshold value.

Although FIGS. 7 through 9 show examples in which information (angular velocities, luminance detection values, or aperture values) is obtained from every other frame, the information may be obtained from every frame, or the information may be obtained once in every three or more frames.

Although FIGS. 7 through 9 show examples in which necessity or unnecessity of the 2-image matching process is determined by using information (angular velocities, luminance detection values, or aperture values) about every other frame, necessity or unnecessity of the 2-image matching process may be determined by using all those pieces of information (angular velocities, luminance detection values, and aperture values). Such an example is shown in FIGS. 10 and 11.

[Example Operation of the Imaging Apparatus]

Figure 10:
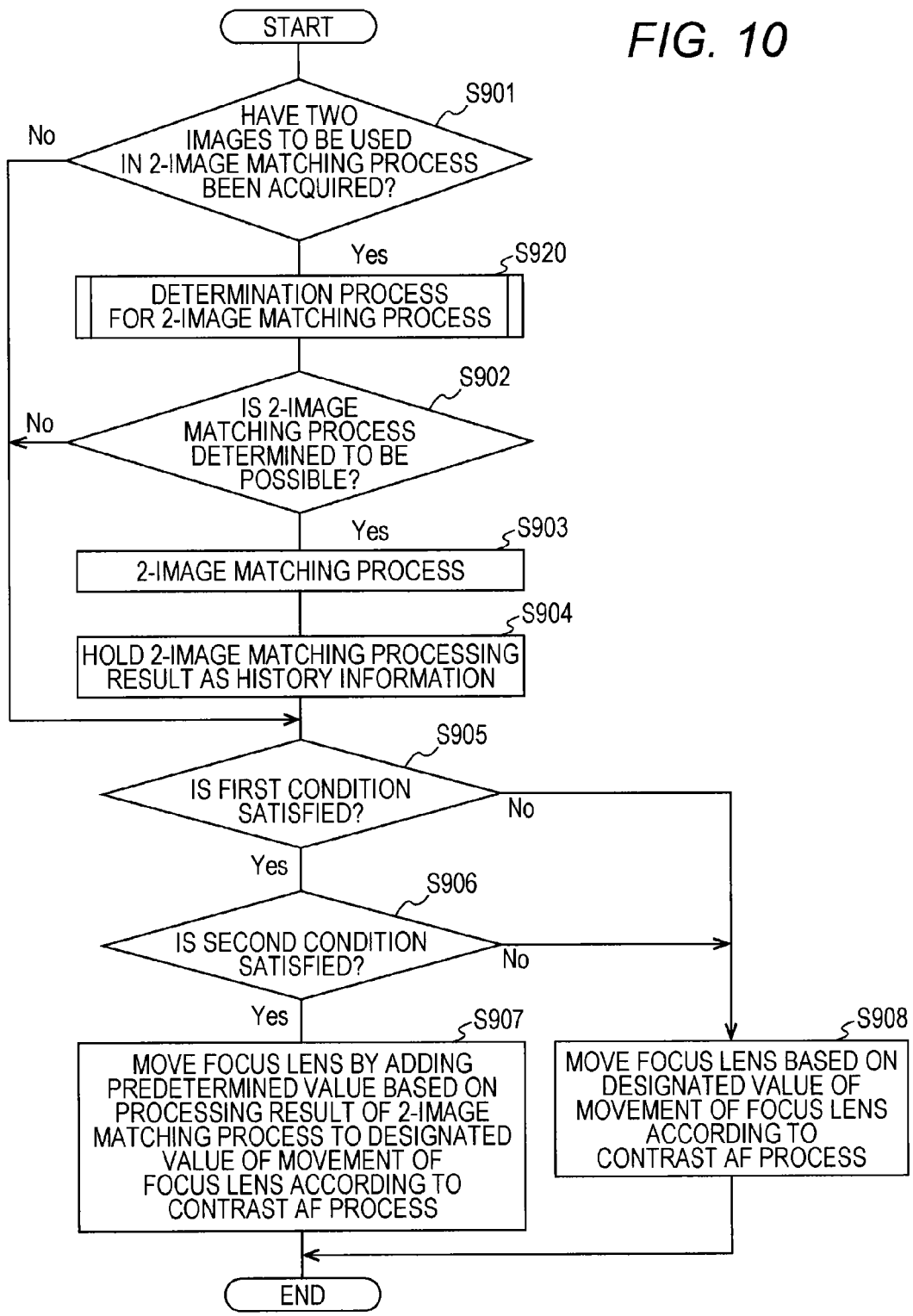
FIG. 10 is a flowchart showing an example of the processing procedures in an AF process to be performed by the imaging apparatus 100 in the first embodiment of the present technique.
Figure 11:
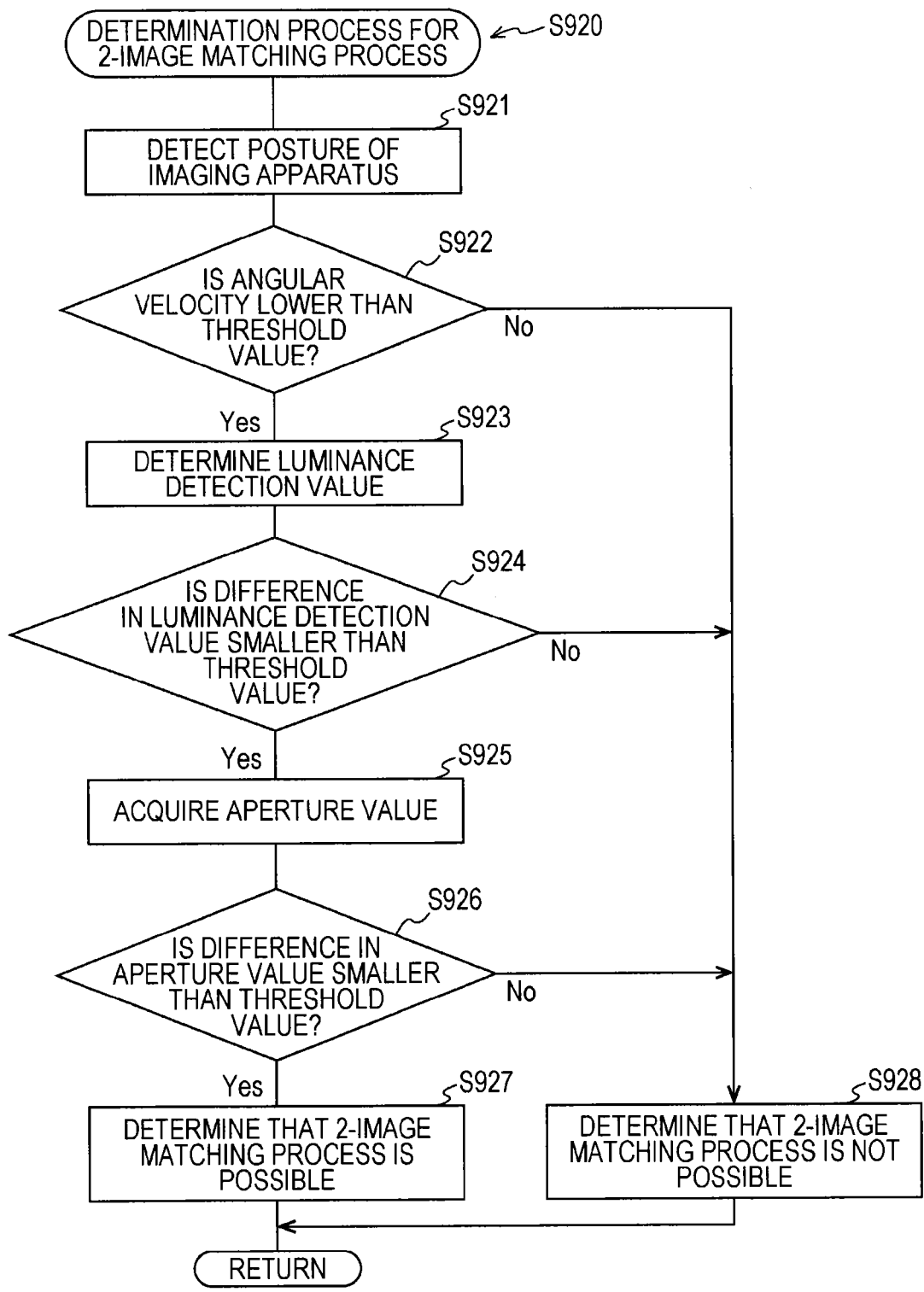
FIG. 11 is a flowchart showing the determination processing procedures among the processing procedures in the 2-image matching process to be performed by the imaging apparatus 100 in the first embodiment of the present technique.

FIG. 10 is a flowchart showing an example of the processing procedures in an AF process to be performed by the imaging apparatus 100 in the first embodiment of the present technique. In this example, these processing procedures are carried out every time an image is generated by the imaging unit 220 in a moving image capturing mode. In these processing procedures, the two images to be used in the 2-image matching process are acquired from frames that are one frame apart from each other, for example.

First, the focus control unit 270 determines whether the two images (the first image and the second image) to be used in the 2-image matching process have been acquired (step S901). If the two images have not been acquired (or if only one image has been acquired) (step S901), the operation moves on to step S905.

If the two images have been acquired (step S901), the focus control unit 270 performs a determination process for the 2-image matching process (step S920). This determination process will be described later in detail, with reference to FIG. 11.

The focus control unit 270 then determines whether the 2-image matching process is determined to be possible by the determination process for the 2-image matching process (step S902). If the 2-image matching process is determined not to be possible, the operation moves on to step S905. If the 2-image matching process is determined to be possible (step S902), the focus control unit 270 performs the 2-image matching process by using the acquired two images (step S903). The focus control unit 270 then causes the history information holding unit 271 to hold the processing result of the 2-image matching process as history information (step S904).

The focus control unit 270 then determines whether the first condition (shown in FIG. 6) is satisfied (step S905).

If the first condition is satisfied (step S905), the focus control unit 270 determines whether the second condition (shown in FIG. 6) is satisfied (step S906). If the second condition is satisfied (step S905), the focus control unit 270 performs focus control by adding the amount of additional movement (predetermined value) to the movement of focus lens according to the contrast AF process (step S907).

If the first condition is not satisfied (step S905), or if the second condition is not satisfied (step S906), the focus control unit 270 performs focus control through a conventional contrast AF process (step S908). That is, focus control is performed through the contrast AF process without the use of the processing result of the 2-image matching process. It should be noted that steps S905 and S906 are an example of the determination step in the claims. Step S907 is an example of the focus control step in the claims.

FIG. 11 is a flowchart showing the procedures in the determination process (the processing procedures in step S920 shown in FIG. 10) among the processing procedures in the 2-image matching process to be performed by the imaging apparatus 100 in the first embodiment of the present technique.

First, the posture detecting unit 210 detects the posture of the imaging apparatus 100 (step S921). The focus control unit 270 calculates a change in posture (angular velocity) based on the currently detected posture of the imaging apparatus 100 and the previously detected posture of the imaging apparatus 100, and determines whether the angular velocity is lower than a threshold value (step S922).

If the angular velocity is lower than the threshold value (step S922), the focus control unit 270 calculates the luminance detection value in an image generated by the imaging unit 220 (step S923). The focus control unit 270 then determines whether the difference between the currently calculated luminance detection value and the previously calculated luminance detection value is smaller than a threshold value (step S924).

If the difference is smaller than the threshold value (step S924), the focus control unit 270 acquires the aperture value in the imaging unit 220 (step S925). The focus control unit 270 then determines whether the difference between the currently acquired aperture value and the previously acquired aperture value is smaller than a threshold value (step S926).

If the difference is smaller than the threshold value (step S926), the focus control unit 270 determines that the 2-image matching process is possible (step S927).

If the angular velocity is equal to or greater than the threshold value (step S922), the focus control unit 270 determines that the 2-image matching process is not possible (step S928). Likewise, if the difference in luminance detection value is equal to or larger than the threshold value (step S924), or if the difference in aperture value is equal to or larger than the threshold value (step S926), the focus control unit 270 determines that the 2-image matching process is not possible (step S928).

As described above, according to the first embodiment of the present technique, high-speed focus control can be performed on an object such as a high-luminance point source that is not compatible with the contrast AF process. Also, execution of the 2-image matching process that leads to a wrongly estimated focusing position can be prevented. Accordingly, the precision of the focus lens moving direction and distance can be improved. Also, the error rate and the speed of AF can be improved. Further, unnecessary calculations can be avoided in advance.

As described above, according to the first embodiment of the present technique, the AF process during a moving image capturing operation can be performed at a higher speed by using the 2-image matching process.

Although the imaging apparatus 100 including the imaging unit 220 has been described as an example of the first embodiment of the present technique, an embodiment of the present technique can be applied to an imaging apparatus (an electronic device) from which an imaging unit can be detached. Also, an embodiment of the present technique can be applied to electronic devices, such as a portable telephone device with an imaging function, and a portable terminal device with an imaging function (a smartphone, for example).

It should be noted that the above described embodiment is merely an example for embodying the present technique, and the matters in the embodiment correspond to the respective inventive matters in the claims. Likewise, the inventive matters in the claims correspond to the respective matters with like names in the embodiment of the present technique. However, the present technique is not limited to the embodiment, and can also be embodied by making various modifications to the embodiment without departing from the scope of the technique.

The processing procedures described in the above described embodiment may be regarded as a method involving the series of procedures, and may also be regarded as a program for causing a computer to carry out the series of procedures or a recording medium storing the program. This recording medium may be a CD (Compact Disc), a MD (MiniDisc), a DVD (Digital Versatile Disk), a memory card, a Blu-ray Disc (a registered trade name), or the like.

The present technique may also be in the following forms.

(1) An imaging apparatus including a focus control unit that performs focus control based on the contrast in an image generated by an imaging unit and the processing result of a 2-image matching process using two images that are generated by the imaging unit with a focus lens being located in different positions.

(2) The imaging apparatus of (1), wherein the focus control unit determines the amount of additional movement of the focus lens based on the processing result of the 2-image matching process when the focus lens is moved based on the contrast.

(3) The imaging apparatus of (2), wherein the focus control unit determines the amount of additional movement only when the difference between the position of the focus lens and a focusing position estimated based on a history of the processing result of the 2-image matching process is larger than a threshold value.

(4) The imaging apparatus of (3), wherein the focus control unit determines the amount of additional movement only when the moving direction of the focus lens based on the contrast coincides with the moving direction of the focus lens based on the estimated focusing position.

(5) The imaging apparatus of (4), wherein the focus control unit determines the amount of additional movement in the coinciding moving direction.

(6) The imaging apparatus of any of (3) through (5), wherein the focus control unit calculates the amount of additional movement based on the difference.

(7) The imaging apparatus of any of (3) through (6), further including
a posture detecting unit that detects a change in the posture of the imaging apparatus,
wherein the focus control unit determines the amount of additional movement without using the matching process result as the history when the detected change in the posture is larger than a threshold value.

(8) The imaging apparatus of any of (3) through (7), wherein the focus control unit determines the amount of additional movement without using the matching process result as the history when the difference between the luminance detection value in the first image and the luminance detection value in the second image is larger than a threshold value.

(9) The imaging apparatus of any of (3) through (8), wherein the focus control unit determines the amount of additional movement without using the matching process result as the history when the difference between the aperture value at the time of the generation of the first image and the aperture value at the time of the generation of the second image is larger than a threshold value.

(10) The imaging apparatus of any of (1) through (9), further including
a posture detecting unit that detects a change in the posture of the imaging apparatus,
wherein the focus control unit performs the focus control without using the processing result of the 2-image matching process when the detected change in the posture is larger than a threshold value.

(11) The imaging apparatus of any of (1) through (10), wherein the focus control unit performs the focus control without using the processing result of the 2-image matching process when the difference between the luminance detection value in the first image and the luminance detection value in the second image is larger than a threshold value.

(12) The imaging apparatus of any of (1) through (11), wherein the focus control unit performs the focus control without using the processing result of the 2-image matching process when the difference between the aperture value at the time of the generation of the first image and the aperture value at the time of the generation of the second image is larger than a threshold value.

(13) A method of controlling an imaging apparatus, including:

a determination step of determining whether a predetermined condition is satisfied; and a focus control step of performing focus control based on the contrast in an image generated by an imaging unit and the processing result of a 2-image matching process using two images when the predetermined condition is satisfied, the two images being generated by the imaging unit with a focus lens being located in different positions.

(14) A program for causing a computer to carry out:

a determination step of determining whether a predetermined condition is satisfied; and a focus control step of performing focus control based on the contrast in an image generated by an imaging unit and the processing result of a 2-image matching process using two images when the predetermined condition is satisfied, the two images being generated by the imaging unit with a focus lens being located in different positions.

REFERENCE SIGNS LIST

100 Imaging apparatus
101 Imaging lens
102 Imaging device
103 Analog signal processing unit
104 A/D converter
105 Digital signal processing unit
106 Liquid crystal panel
107 Viewfinder
108 Recording device
109 Object detecting unit
110 Gyro sensor
120 Control unit
131 EEPROM
132 ROM
133 RAM
140 Operation unit
151 TG
152 Motor driver
153 Focus lens drive motor
154 Zoom lens drive motor
210 Posture detecting unit
220 Imaging unit
230 Image processing unit
240 Recording control unit
241 Content storage unit
250 Display control unit
251 Display unit
260 Control unit
270 Focus control unit
271 History information holding unit
290 Operation receiving unit

The invention claimed is:

1. An imaging apparatus comprising:
a focus control unit configured to:
perform focus control based on a contrast in an image generated by an imaging unit and a processing result of a two-image matching process using two images, the two images being generated by the imaging unit with a focus lens being located in different positions;
determine, during the focus control, whether a moving direction of the focus lens, determined based on the contrast, coincides with a moving direction of the focus lens determined based on the processing result of the two-image matching process; and
determine an amount of additional movement of the focus lens based on the processing result of the two-image matching process in an event the focus lens is moved based on the contrast,
wherein the focus control unit is configured to determine the amount of additional movement in an event a difference between a position of the focus lens and a focusing position estimated based on a history of the processing result of the two-image matching process is larger than a first threshold value, and
wherein the amount of additional movement is a distance less than the difference between the position of the focus lens and the focusing position estimated based on the history of the processing result of the two-image matching process.

2. The imaging apparatus according to claim 1, wherein the focus control unit is configured to determine the amount of additional movement only in an event the moving direction of the focus lens based on the contrast coincides with the moving direction of the focus lens based on the estimated focusing position.

3. The imaging apparatus according to claim 2, wherein the focus control unit is configured to determine the amount of additional movement in the coinciding moving direction.

4. The imaging apparatus according to claim 1, wherein the focus control unit is configured to calculate the amount of additional movement based on the difference.

5. The imaging apparatus according to claim 1, further comprising a posture detecting unit configured to detect a change in a posture of the imaging apparatus, wherein the focus control unit is configured to determine the amount of additional movement without using the processing result as the history in an event the detected change in the posture is larger than a second threshold value.

6. The imaging apparatus according to claim 1, wherein the focus control unit is configured to determine the amount of additional movement without using the processing result as the history in an event a difference between a luminance detection value in a first image of the two images and a luminance detection value in a second image of the two images is larger than a second threshold value.

7. The imaging apparatus according to claim 1, wherein the focus control unit is configured to determine the amount of additional movement without using the processing result as the history in an event a difference between an aperture value at the time of generation of a first image of the two images and an aperture value at the time of generation of a second image of the two images is larger than a second threshold value.

8. The imaging apparatus according to claim 1, further comprising a posture detecting unit configured to detect a change in a posture of the imaging apparatus, wherein the focus control unit is configured to perform the focus control without using the processing result of the two-image matching process in an event the detected change in the posture is larger than a threshold value.

9. The imaging apparatus according to claim 1, wherein the focus control unit is configured to perform the focus control without using the processing result of the two-image matching process in an event a difference between a luminance detection value in a first image of the two images and a luminance detection value in a second image of the two images is larger than a threshold value.

10. The imaging apparatus according to claim 1, wherein the focus control unit is configured to perform the focus control without using the processing result of the two-image matching process in an event a difference between an aperture value at the time of generation of a first image of the two images and an aperture value at the time of generation of a second image of the two images is larger than a threshold value.

11. A method of controlling an imaging apparatus, comprising:
  determining whether a predetermined condition is satisfied, wherein the predetermined condition includes a moving direction of a focus lens determined based on a contrast in an image generated by an imaging unit that coincides with a moving direction of the focus lens determined based on a processing result of a two-image matching process;
  performing focus control based on the contrast in the image generated by the imaging unit and the processing result of the two-image matching process using two images in an event the predetermined condition is satisfied, the two images being generated by the imaging unit with the focus lens being located in different positions; and
  determining an amount of additional movement of the focus lens based on the processing result of the two-image matching process in an event the focus lens is moved based on the contrast,
  wherein the amount of additional movement is determined in an event a difference between a position of the focus lens and a focusing position estimated based on a history of the processing result of the two-image matching process is larger than a threshold value, and
  wherein the amount of additional movement is a distance less than the difference between the position of the focus lens and the focusing position estimated based on the history of the processing result of the two-image matching process.

12. A non-transitory computer-readable storage medium, having stored thereon, a set of instructions which when executed by a computer causes the computer to perform the steps comprising:
  determining whether a predetermined condition is satisfied, wherein the predetermined condition includes a moving direction of a focus lens determined based on a contrast in an image generated by an imaging unit that coincides with a moving direction of the focus lens determined based on a processing result of a two-image matching process;
  performing focus control based on the contrast in the image generated by the imaging unit and the processing result of the two-image matching process using two images in an event the predetermined condition is satisfied, the two images being generated by the imaging unit with the focus lens being located in different positions, and
  determining an amount of additional movement of the focus lens based on the processing result of the two-image matching process in an event the focus lens is moved based on the contrast,
  wherein the amount of additional movement is determined in an event a difference between a position of the focus lens and a focusing position estimated based on a history of the processing result of the two-image matching process is larger than a threshold value, and
  wherein the amount of additional movement is a distance less than the difference between the position of the focus lens and the focusing position estimated based on the history of the processing result of the two-image matching process.

* * * * *